United States Patent
Niederberger et al.

(12) 
(10) Patent No.: US 6,579,547 B2
(45) Date of Patent: Jun. 17, 2003

(54) METHOD OF MAKING REFRIGERATABLE DOUGH COMPOSITIONS FOR THE PREPARATION OF BAKED PRODUCTS

(75) Inventors: Peter Niederberger, Epalinges (CH); Christof Gysler, Blonay (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/765,687

(22) Filed: Jan. 22, 2001

(65) Prior Publication Data

US 2001/0036494 A1 Nov. 1, 2001

Related U.S. Application Data

(63) Continuation of application No. PCT/EP99/05218, filed on Jul. 21, 1999.

(30) Foreign Application Priority Data

Jul. 22, 1998 (EP) .............................. 98113711

(51) Int. Cl.$^7$ ................................. A21D 8/04
(52) U.S. Cl. ............................ 426/62; 426/19; 426/27
(58) Field of Search ............................. 426/19, 27, 62, 426/549, 551, 653

(56) References Cited

U.S. PATENT DOCUMENTS 5,385,742 A * 1/1995 Van Eijk ..................... 426/19
5,399,492 A   3/1995 Gysler et al. ............. 435/172.1
5,508,047 A   4/1996 Domingues ..................... 426/8
5,571,544 A  11/1996 Domingues ................... 426/62
5,759,596 A   6/1998 Domingues et al. ........... 426/8
5,776,526 A   7/1998 Baensch et al. ............. 426/62

FOREIGN PATENT DOCUMENTS

EP 0 442 575 A1 8/1991
EP 0 672 349 9/1995

* cited by examiner

*Primary Examiner*—Keith Hendricks
(74) *Attorney, Agent, or Firm*—Winston & Strawn

(57) ABSTRACT

The present invention relates to dough compositions, adapted for storage under refrigerated conditions, a method for preparing the dough compositions, and baked products containing the dough composition. The dough compositions contain at least one strain of a lti-yeast and one or more sugars fermentable by the lti-yeast in an amount so that the dough composition will give rise to a $CO_2$ production of between about 50 to 250 ml/100 g dough within a time period not exceeding 1 week after the dough is prepared and a total amount of $CO_2$ production during the 5 week period after the dough is prepared being limited to about 400 ml/100 g dough. The refrigeratable dough composition provide baked goods having excellent texture and flavor even when being stored for a prolonged period of time.

9 Claims, 2 Drawing Sheets

METHOD OF MAKING REFRIGERATABLE DOUGH COMPOSITIONS FOR THE PREPARATION OF BAKED PRODUCTS

CROSS REFERENCE TO RELATED APPLICATIONS

This application is a continuation of the national stage designation of International Application PCT/EP99/05218, filed Jul. 21, 1999, the contents of which are expressly incorporated herein by reference thereto.

SUMMARY OF THE INVENTION

The invention relates to novel dough compositions, especially compositions adapted for storage under refrigerated conditions, a method for preparing the dough compositions, and baked products containing the dough composition. In particular, the present invention pertains to a refrigeratable dough composition for use in preparing edible baked goods, which maintains its capability to provide baked goods having excellent texture and flavor even after being stored for a prolonged period of time.

BACKGROUND OF THE INVENTION

A variety of different refrigeratable dough products are currently available to consumers to produce different sorts of baked products. Products containing ordinary baker's yeast, however, may only be stored for quite a limited period of time since, even under conditions of low temperature, the yeast shows substantial activity resulting in a consistent production of carbon dioxide. This continuous development of gas eventually results in leavening of the dough during storage, i.e., in the refrigerator. Moreover, the continued activity of the yeast beyond the desired degree of proofing deleteriously affects the organoleptic and rheological properties of the dough, resulting in final baked products that are unacceptable.

For this reason most of the commercial dough compositions do not contain yeast to leaven the dough. Rather they contain chemical agents, so that they may be stored for a prolonged period of time without occurrence of the known detrimental effects of yeasts. The advantage of such chemical leavening agents is that their behavior is based on a predictable chemical reaction, thus, allowing control of the volume of carbon dioxide produced to leaven the dough. Although the storage lifetime of products leavened by means of chemical agents may be extended, the final baked goods obtained therewith are known to be inferior compared to products leavened by means of baker's yeast. In particularly, the texture of the products is often not acceptable to customers. The products also lack flavorings produced by the yeast during its activity.

Another approach to avoid the problems encountered with the use of yeast in dough compositions under long term storage at refrigeration conditions, is to store the yeast containing dough, optionally in pre-baked form, at freezing temperatures of about −20° C. to reduce the activity of the yeast to a minimum. To this end U.S. Pat. No. 5,385,742 teaches the use of a dough composition that utilizes the substrate limiting concept. Accordingly, a dough is leavened with a maltase negative yeast and is subsequently frozen for long term storage.

This approach, however, has also been shown to be unsatisfactory in that products prepared from frozen dough compositions are not as convenient for the consumer as are refrigerated dough products. The frozen dough has to be thawed and, in most instances, pre-proofed prior to baking. Furthermore, the pre-proofing has to be monitored by the consumer to avoid extensive proofing of the dough. Moreover, the texture of the final baked product derived from frozen dough has been shown to be inferior to products produced from non-frozen dough. Furthermore, the characteristic flavor associated with yeast leavening is inferior or often completely lacking.

Recently low temperature inactive strains of baker's yeast (lti-strains) have been developed. These yeast strains are essentially inactive at low temperatures, but retain their activity when brought to higher temperatures.

U.S. Pat. No. 5,399,492 describes a process for constructing yeast strains having the lti-property, wherein a strain of *Saccharomyces cerevisiae* is subjected to a mutagenic treatment, at least one mutant having an lti-property is selected and is backcrossed at least once with a wild type haploid strain of *Saccharomyces cerevisiae* having an opposite mating type, at least two backcross segregants having an lti property and opposite mating types are then selected and are crossed at least once, and a diploid strain having a growth potential, a lti-property, and the ability to raise a dough is selected.

The construction of different lti-derivatives has also been described. In U.S. Pat. No. 5,776,526 there is described a process for constructing lti-strains that react more slowly with the maltose contained in the dough. These strains may be obtained by crossing a haploid *Saccharomyces cerevisiae* having an lti-property with a haploid *Saccharomyces cerevisiae* strain having an active maltase gene, that is under catabolic repression, subsequently crossing the segregants and selecting a diploid strain showing an lti-property, an active Mal-phenotype (Mal$^{(+)}$ expressing the gene coding for maltase either inducible (wild-type) or constitutively), and having growth potential.

For a dough composition to be stored at refrigerator conditions and to eventually result in a baked product having the desired texture and excellent flavoring the activity of the yeast in the dough must be carefully controlled. To this end the activity should not be entirely null during storage, since otherwise an unacceptable texture will be formed and no flavorings will be produced. An extensive activity of the yeast, however, is known to lead to excessive leavening of the dough during storage with the flavor deteriorating with continuing metabolic action of the yeast.

With regard to using current yeast-strains having an lti-property, these strains have been found to produce dough with good texture and flavor properties only in a time range of refrigerated storage between 2 and 3 weeks. The dough tends to be underdeveloped in the first week and overdeveloped or even deteriorated between 4 and 5 weeks.

To date scientists have not been able to develop dough compositions that provide the desired properties, over the entire shelf life of the dough, i.e., to provide a yeast containing dough composition having an activity that is necessary to provide baked products having the same or a similar texture and flavor as compared to products prepared from freshly prepared dough.

SUMMARY OF THE INVENTION

The present invention relates to a dough composition for the preparation of yeast leavened products. The dough composition includes at least one strain of a lti-yeast and one or more sugars fermentable by the lti-yeast in an amount sufficient such that the dough composition produces about 50 to 250 ml $CO_2$/100 g dough within a time period not exceeding 1 week after the dough is prepared and not more than about 400 ml of $CO_2/100$ g dough during a 5 week period after the dough is prepared to facilitate storage of the dough at refrigeration temperatures.

The lti-yeast may constitutively expresses maltase and in one embodiment the maltase expression is repressed by glucose. The sugar may be glucose, fructose, saccharose, maltose, or mixtures thereof. The amount of sugar may be from about 0.5 to 5.6 mMol/100 g dough. The sugar may be saccharose in an amount of about 1 to 5.6 mMol/100 g dough or the sugar may be glucose in an amount of about 1 to 2.6 mMol/100 g dough.

The amount of $CO_2$ produced during the time period not exceeding 1 week after the dough is prepared may be about 100 to 250 ml/100 g dough and the amount of $CO_2$ produced during the 5 week period after the dough is prepared may be about 300 ml/100 g dough. The amount of $CO_2$ produced by the dough may be determined at a temperature between about 4° C. and 13° C.

The present invention also relates to a method for producing the dough of the invention. The method involves mixing water, flour, at least one strain of a lti-yeast, and one or more sugars fermentable by the lti-yeast to provide a dough composition wherein the water, flour, at least one strain of a lti-yeast, and one or more sugars fermentable by the lti-yeast are present in amounts sufficient to enable the dough composition to produce about 50 to 250 ml $CO_2/100$ g dough within a time period not exceeding 1 week after the dough is prepared and not more than about 400 ml of $CO_2/100$ g dough during a 5 week period after the dough is prepared to facilitate storage of a dough composition at refrigeration temperatures.

BRIEF DESCRIPTION OF THE DRAWINGS

The invention will be described with reference to preferred embodiments and the figures, wherein.

DETAILED DESCRIPTION OF THE PREFERRED EMBODIMENTS

Figure 1:
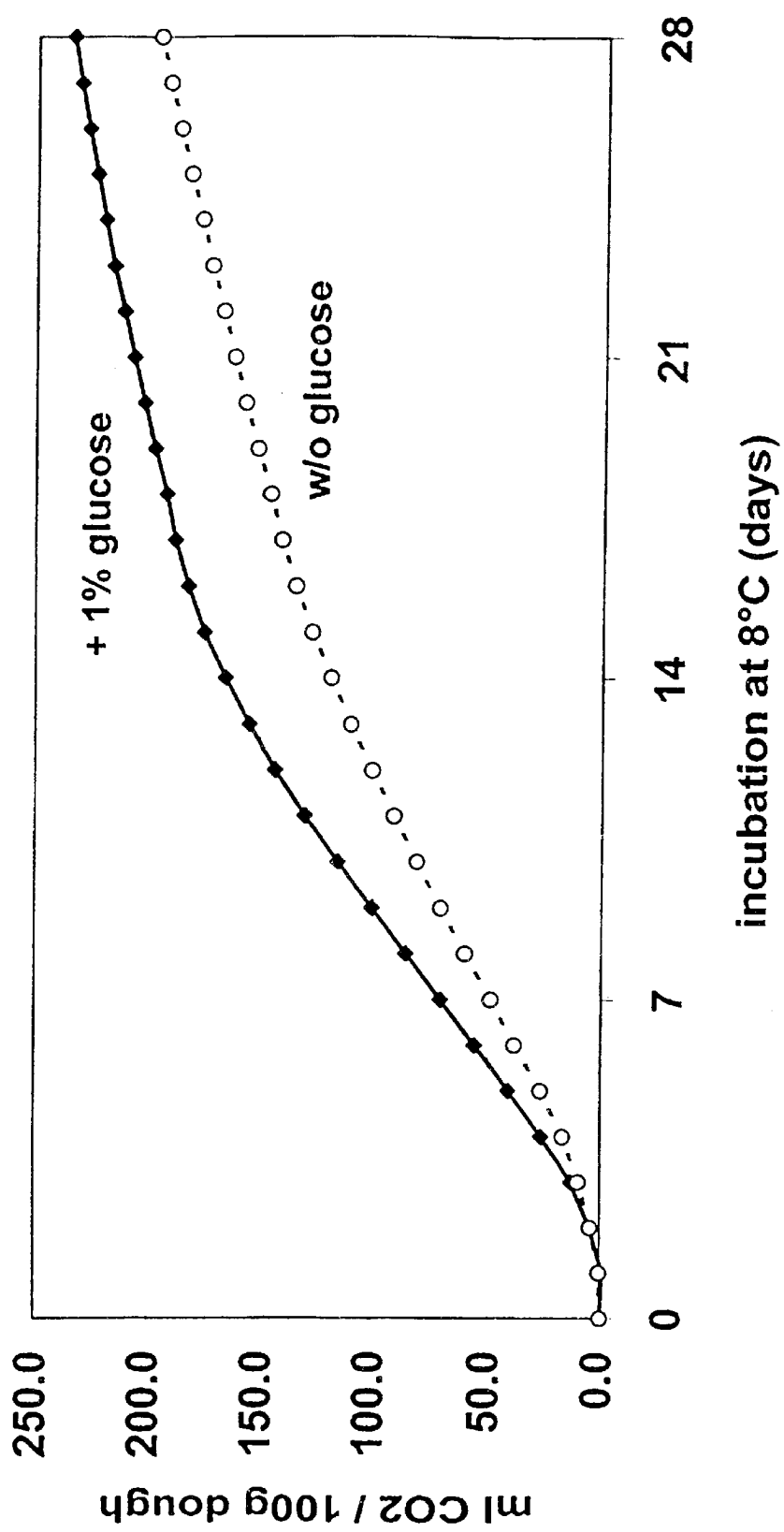
FIG. 1 is a graph illustrating the production of $CO_2$ during 28 days, using 0.1% by weight dry matter of the lti-strain L500 as yeast and including 1% by weight glucose in the dough.

The present invention overcomes the disadvantages of the prior art and provides dough compositions giving rise to final baked products that show excellent properties with regard to texture and flavor. The present invention also provides a method for preparing the dough.

During extensive studies leading to the present invention the inventors have found that if the overall activity of lti-yeasts is controlled in a particular manner the above problems with prior art dough can be solved. Hence, it has been found that in order to convey the desired properties to the final baked goods a major part of (yeast) activity in the dough composition, as evidenced by the development of $CO_2$, should be exerted within a limited time period after preparation of the dough (representing an activity-boost, which should not be too excessive but at the same time not be too low), while during the subsequent weeks of storage the yeast should exhibit only a relatively low activity.

The present invention provides dough compositions capable of being stored at refrigeration temperatures for the preparation of yeast leavened products, comprising at least one strain of a lti-yeast and one or more sugars fermentable by the lti-yeast in an amount, so that the dough compositions show a $CO_2$ production of between about 50 and 250 ml/100 g dough within a time period after preparation not exceeding 1 week and with the total amount of $CO_2$ production during 5 weeks after preparation being limited to about 400 ml/100 g dough.

The strain L500 [NCIMB 403291] and the process of construction is described in detail in EP-0 487 878, which document is included herein by way of reference. The lti-yeast LCG22 [NCIMB 40612] utilized is a yeast as described in EP-0 663 441, the content of which is incorporated herein by way of reference.

It has been found that a dough composition with the above mentioned features, giving rise to the particular $CO_2$ profile, provides an excellent texture, which is conveyed to the refrigeratable dough composition within the first hours or days after its preparation, which texture is maintained and even improved during the shelf life, yielding products produced therewith with excellent qualities. Since the metabolic activity of the yeast is maintained at a certain, yet low level, during storage the flavor that has developed during the first few days after preparation of the dough is not deteriorated but rather improved.

The activity boost of the lti-yeast should give rise to a $CO_2$ production of between about 50 to 250 ml $CO_2/100$ g dough, preferably about 100 to 250 ml $CO_2/100$ g dough and may be carried out at ambient or slightly raised temperatures as are typically utilized in the art. According to a preferred embodiment the activity boost may be carried out at refrigerated temperatures of about 4° C. to 13° C.

The time period for the activity boost varies depending on the amount or type of sugar or yeast utilized and the temperature applied. The time period may be in the range of from 1 to several hours (in the case of boosting at ambient or higher temperatures) or within 1 week. The skilled artisan will readily be able to adjust the appropriate time depending on the factors to be considered. Accordingly, the activity boost may well be completed after 1, 2, 3, 4, 5, 6, or 7 days. The boosting process should be completed after 1 week, so that after this period only a minor activity of the yeast is to be found. It is, however, preferred that the $CO_2$ production is performed by the yeast in a slow manner, so that an excellent texture of the dough be formed. This may be best achieved by bringing the dough composition to refrigerator temperatures of about 4° C. to 13° C. immediately after its preparation and storing the composition at these temperatures.

According to a preferred embodiment the lti-strains utilized may be strains that express the maltase gene non-constitutively or constitutively, as long as the activity of the yeast does not lead to a $CO_2$ production that exceeds the indicated limits of $CO_2$ production. On the other hand, in order to avoid an excessive activity of the yeast, for example, from the consumption of maltose present in the dough, the lti-yeast may be selected to be repressed by glucose.

In addition mixtures of lti-yeast strains having different phenotypes may be employed. Consequently a mixture of a Mal$^{(-)}$ lti-strain (a yeast strain that is not capable of metabolizing maltose) together with a Mal$^{(+)}$ lti-strain, which is optionally catabolically repressed by glucose, is well within the scope of the invention. The skilled person will readily be able to select an appropriate mixture of lti-strains from the available lti-strains that is in agreement with the factors influencing the yeast activity, such as the presence of maltose, the temperature, other sugars present, and the like so as to adapt the dough composition to the $CO_2$ profile according to the present invention.

The sugar may be any sugar(s) that can be metabolized by the yeast strain being utilized, such as glucose, saccharose, or fructose. Maltose may well be the sugar of choice, if it is contained in the dough composition in an adequate amount so as not to lead to excessive $CO_2$ production. The maltose may be provided, for example, by the action of amylases present in the dough on the starch of the flour being utilized.

In general, it is preferred that the amount of sugar fermentable by the lti-yeast be included in the dough in an amount so that the above demands for $CO_2$ production are met. Thus, with regard to the exemplary inclusion of glucose in the dough composition, the following equation may be cited, which shows the maximal amount of $CO_2$ to be obtained:

1 Mol Glucose (180 g)→2 Mol $CO_2$ (44,8 l)

1 g Glucose→249 ml $CO_2$

Thus, by including a maximum of 1 g of glucose in 100 g of dough containing a lti-yeast, the yeast will ferment the sugar to yield a maximum amount of $CO_2$ of about 249 ml. After consumption of glucose the $CO_2$ production decreases due to the lack of an adequate fermentable sugar, with the yeast slowly starting to utilize a different carbon source. In order to arrive at the desired $CO_2$ profile the skilled person will readily be able to select the appropriate amount of the sugar depending on the type of sugar used (e.g., glucose or saccharose) and a consideration of other parameters according to ordinary technical skill.

Thus, the total amount of sugar to be included in the dough may be within a range of from about 0.5 mMol to 5.6 mMol/100 g dough. For glucose the preferred amount is from about 1 to 5.6 mMol, more preferably about 4 to 5.6 mMol, most preferred about 5 mMol. For saccharose the preferred amount is from about 0.5 mMol to 2.6 mMol, more preferably about 1 to 2.5 mMol, most preferably about 2.5 mMol.

The total amount of $CO_2$ production of the dough for a time period of 5 weeks after its preparation is limited to about 400 ml $CO_2$/100 g dough, preferably about 350 ml $CO_2$/100 g dough, more preferably about 300 ml $CO_2$/100 g dough.

The method of the present invention comprises mixing water, flour, at least one strain of a lti-yeast, and one or more sugars fermentable by the lti-yeast in an amount so that the dough composition will give rise to a $CO_2$ production of about 50 to 250 ml/100 g dough within a time period after its preparation not exceeding 1 week, with the total amount of $CO_2$ production during 5 weeks after its preparation being limited to about 400 ml/100 g dough.

The flour utilized may be any flour commercially available, though it may be advantageous to use flour that contains a certain amount of damaged starch, which may serve as a sugar source for the lti-yeast present. Thus, the activity boost may be carried out by using the maltose present in the flour, in the case where a lti-yeast is used that can metabolize maltose. The activity boost may likewise be effected by including a different sort of sugar, e.g., glucose, in the dough composition, wherein the lti-yeast has a maltase gene which is repressed by glucose. In this case the initial boost with glucose also serves to repress the maltase gene of the lti-yeast. After consumption of the glucose the maltase repression slowly decreases and the yeast slowly starts to ferment the maltose.

Water is generally added according to the hydration capacity of the flour and the potential influence of other components contained in the dough, which may increase or decrease this capacity, until a workable dough is formed.

The dough may optionally contain salts, preferably sodium chloride, in an amount of 0 to 8 parts by weight, based on the amount of flour being 100 parts by weight. Further, ethanol may be included in an amount of from 0 to 8 parts by weight, again based on the amount of flour being 100 parts.

The yeast may be added as dry yeast, rehydrated in all or in part by the water used to prepare the dough. The use of a press cake, having a dry matter content of about 20 to 40%, or the use of yeast-cream, having a dry matter content of about 10 to 20%, may likewise be envisaged, with the amount of water added to the flour being adjusted correspondingly.

The sugar may be added in amounts so that the requirements with respect to yeast activity under refrigerator conditions are met.

The activity of the yeast in the dough is measured according to the development of $CO_2$ by the dough. For measuring the development of $CO_2$ a variety of different apparatuses are known. It is, however, acknowledged that most of the methods available do not give reliable results. The measurements of the $CO_2$ development in the doughs are therefore carried out by means of the "Niesler," an apparatus for reliably determining the amount of gas developed. This apparatus comprises a gas-tight vessel, having integrated therein a pressure sensor for sensing the absolute pressure, and a valve for discharging gas. In exercising the apparatus the dough is charged into the vessel and the vessel is sealed in a gas tight manner. The amount of developing gas is detected via the increase of the pressure in the vessel. From time to time the pressure built up in the interior of the vessel is discharged via the valve, which may be effected automatically. The vessels are kept in an environment having a constant temperature so that the influence of temperature changes on the sample are avoided. The sensor is extremely sensitive to pressure changes and can detect a change in pressure of as little as 0.1 mbar. For example, for a vessel having a volume of 500 ml an additional gas volume of 50 $\mu$L may be detected. Since the apparatus provides for a measurement of different absolute pressures no reference measurements are required. Consequently the "Niesler" provides for parallel measurements at different temperatures. The data obtained are fed to a computer wherein they are processed to provide a suitable display showing the volume of gas produced in the vessel. The "Niesler" is commercially available and may be obtained from Biospectra AG, Schlieren (CH).

EXAMPLES

The invention will now be described with reference to the following examples which are not to be construed to limit the scope of the present invention.

Example 1

The following recipe has been used to produce a yeast dough with glucose as additional sugar.

| Ingredient | Parts by weight | Percent |
| --- | --- | --- |
| Flour (Bruggmühle, type 400, Goldach, CH) | 100 | 63.84 |
| Salt (NaCl) | 2.47 | 1.58 |
| Ethanol | 1.63 | 1.04 |
| Water | 50.81 | 32.44 |
| Yeast dry matter (L500 (Lti-strain)) | 0.157 | 0.10 |
| Glucose | 1.57 | 1.00 |

The dough was divided into aliquots of 100 g and introduced into the vessels of the "Niesler," wherein the dough composition was held over a time period of 4 weeks at a temperature of about 8° C. During the time period the development of $CO_2$ was measured. The results of these measurements are shown in FIG. 1. When baking the dough prepared in this manner after 1, 2, 3, 4, or 5 weeks the product showed an excellent texture and flavor that was comparable to that of products prepared from freshly mixed dough compositions.

Example 2

The procedure of example 1 was repeated with the following recipe to produce a yeast dough with glucose as additional sugar.

| Ingredient | Parts by weight | Percent |
| --- | --- | --- |
| Flour (Bruggmühle, type 400, Goldach, CH) | 100 | 63.84 |
| Salt (NaCl) | 2.47 | 1.58 |
| Ethanol | 1.63 | 1.04 |
| Water | 49.4 | 32.24 |
| Yeast dry matter (LCG22 (lti-strain)) | 0.147 | 0.3 |
| Glucose | 1.57 | 1.0 |

Figure 2:
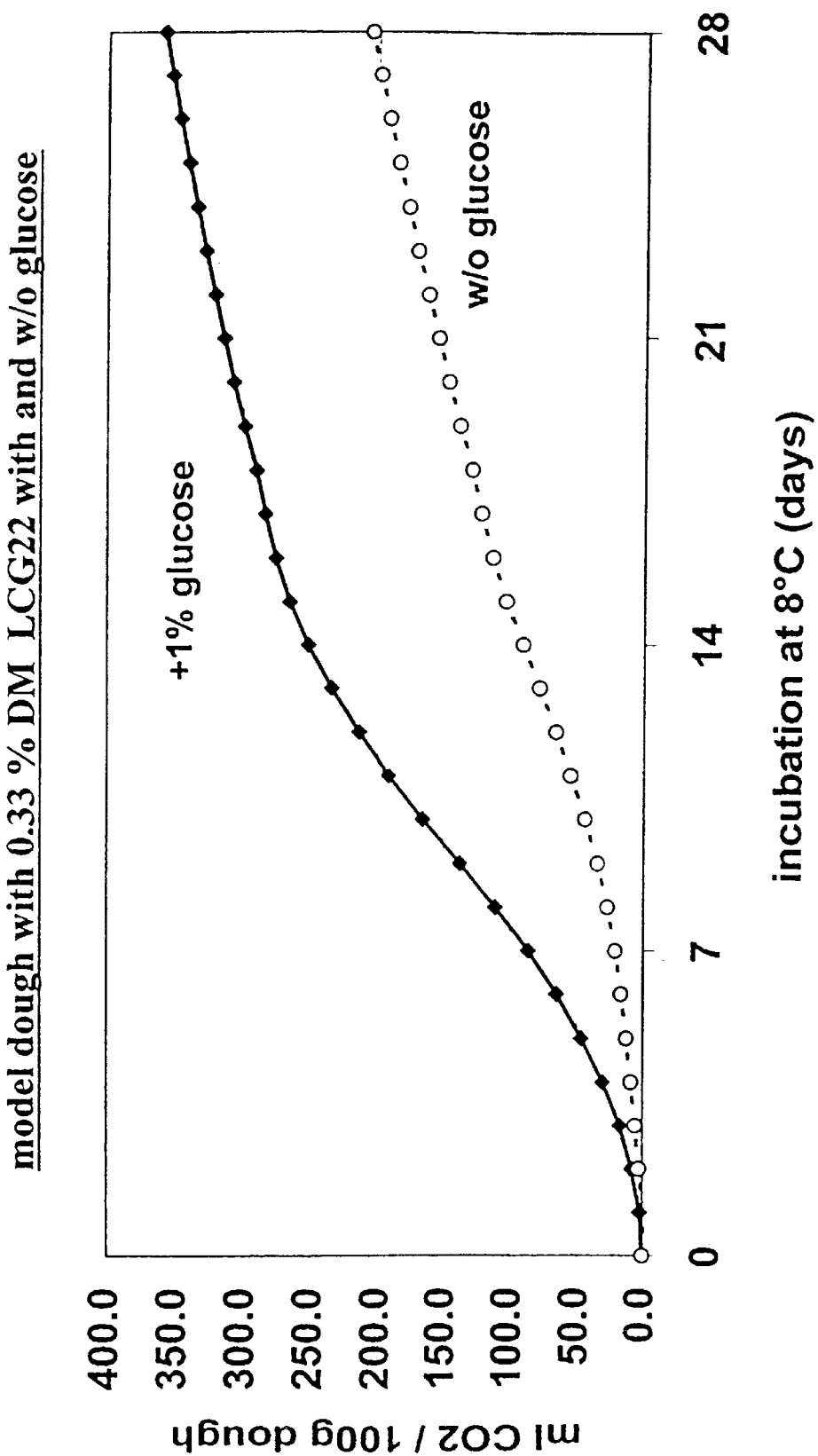
FIG. 2 is a graph illustrating the production of $CO_2$ during 28 days, using 0.3% by weight dry matter of the lti-strain LCG 22 as yeast and including 1% by weight glucose in the dough.

The dough was divided into aliquots of 100 g and subjected to a measurement with the "Niesler" over a period of 4 weeks as described in example 1. The results of these measurements are shown in FIG. 2. Also this dough composition, when baked after 1, 2, 3, 4, and 5 weeks after its preparation, yielded products comparable to those made from freshly prepared dough compositions.

What is claimed is:

1. A method for producing a dough composition for the preparation of yeast leavened products, which comprises mixing water, flour, at least one strain of a lti-yeast, and one or more sugars fermentable by the lti-yeast to provide a dough composition wherein the sugar fermentable by the lti-yeast is provided in an amount from about 0.5 to 5.6 mMol/100 g dough; and storing the dough composition for a period of between one and five weeks at a temperature of between 4 and 13° C. with the yeast producing between about 50 and 250 ml CO2/100 g dough after one week and less than about 400 ml CO2/100 g dough after five weeks, such that, when the dough composition is baked after 1, 2, 3, 4 or 5 weeks storage, a baked product comparable to a freshly baked dough product is obtained.

2. The method of claim 1, wherein the lti-yeast constitutively expresses maltose.

3. The method of claim 2, wherein the expression of maltase is repressed by glucose.

4. The method of claim 1, wherein the sugar comprises glucose, fructose, saccharose, maltose, or mixtures thereof.

5. The method of claim 1, wherein the sugar is saccharose in an amount of about 1 to 5.6 mMol/100 g dough.

6. The method of claim 1, wherein the sugar is glucose in an amount of about 1 to 2.6 mMol/100 g dough.

7. The method of claim 1, wherein the amount of $CO_2$ produced during the initial one week storage period is about 100 to 250 ml/100 g dough.

8. The method of claim 1, wherein the dough is stored for a period of five weeks.

9. The method of claim 8, wherein the amount of $CO_2$ produced during the 5 week storage period is about 300 ml/100 g dough.

* * * * *